United States Patent
Khatri

(10) Patent No.: US 7,605,706 B2
(45) Date of Patent: Oct. 20, 2009

(54) PATCH ANTENNA FOR RFID TAG

(75) Inventor: Mohamed Fayaz Khatri, Miamisburg, OH (US)

(73) Assignee: The Kennedy Group, Inc., Willoughby, OH (US)

( * ) Notice: Subject to any disclaimer, the term of this patent is extended or adjusted under 35 U.S.C. 154(b) by 252 days.

(21) Appl. No.: 11/129,094

(22) Filed: May 13, 2005

(65) Prior Publication Data

US 2006/0255946 A1 Nov. 16, 2006

(51) Int. Cl.
G08B 13/14 (2006.01)

(52) U.S. Cl. ............ 340/572.7; 340/568.1; 340/539.11; 340/531

(58) Field of Classification Search .............. 340/568.1, 340/572.1, 572.7, 572.8, 572.4, 531, 539.1, 340/539.11, 539.13; 343/872, 873, 846, 343/700 R
See application file for complete search history.

(56) References Cited

U.S. PATENT DOCUMENTS

| | | | |
|---|---|---|---|
| 4,068,232 A * | 1/1978 | Meyers et al. .................. 342/44 |
| 5,552,790 A | 9/1996 | Gunnarsson |
| 5,945,938 A * | 8/1999 | Chia et al. ..................... 342/42 |
| 5,995,048 A * | 11/1999 | Smithgall et al. ..... 343/700 MS |
| 6,215,402 B1 * | 4/2001 | Rao Kodukula et al. .. 340/572.8 |
| 6,281,794 B1 * | 8/2001 | Duan et al. ............... 340/572.1 |
| 6,329,915 B1 * | 12/2001 | Brady et al. ............. 340/572.1 |
| 6,342,830 B1 * | 1/2002 | Want et al. ................. 340/10.1 |
| 6,816,076 B2 * | 11/2004 | Pomes ..................... 340/572.1 |
| 6,924,688 B1 * | 8/2005 | Beigel ........................ 327/330 |

FOREIGN PATENT DOCUMENTS

| | | |
|---|---|---|
| EP | 1 055 943 A2 | 5/2000 |
| WO | WO 93/15417 | 8/1993 |
| WO | WO 00/36572 | 6/2000 |
| WO | WO 00/43952 | 7/2000 |

* cited by examiner

Primary Examiner—Benjamin C Lee
Assistant Examiner—Daniel Previl

(57) ABSTRACT

An antenna for use with a Radio Frequency Identification, RFID, tag. A well-known, simple "patch antenna" is formed by two metallic plates, one larger than the other, between which is sandwiched a dielectric sheet. Under the invention, the larger metallic plate is provided by the wall of a metallic shipping container. Thus, one form of the invention includes (1) the smaller metallic sheet, (2) the dielectric sheet, and (3) an RFID circuit. When the dielectric sheet is attached to the wall of the shipping container, a patch antenna is generated which the RFID circuit can use.

6 Claims, 11 Drawing Sheets

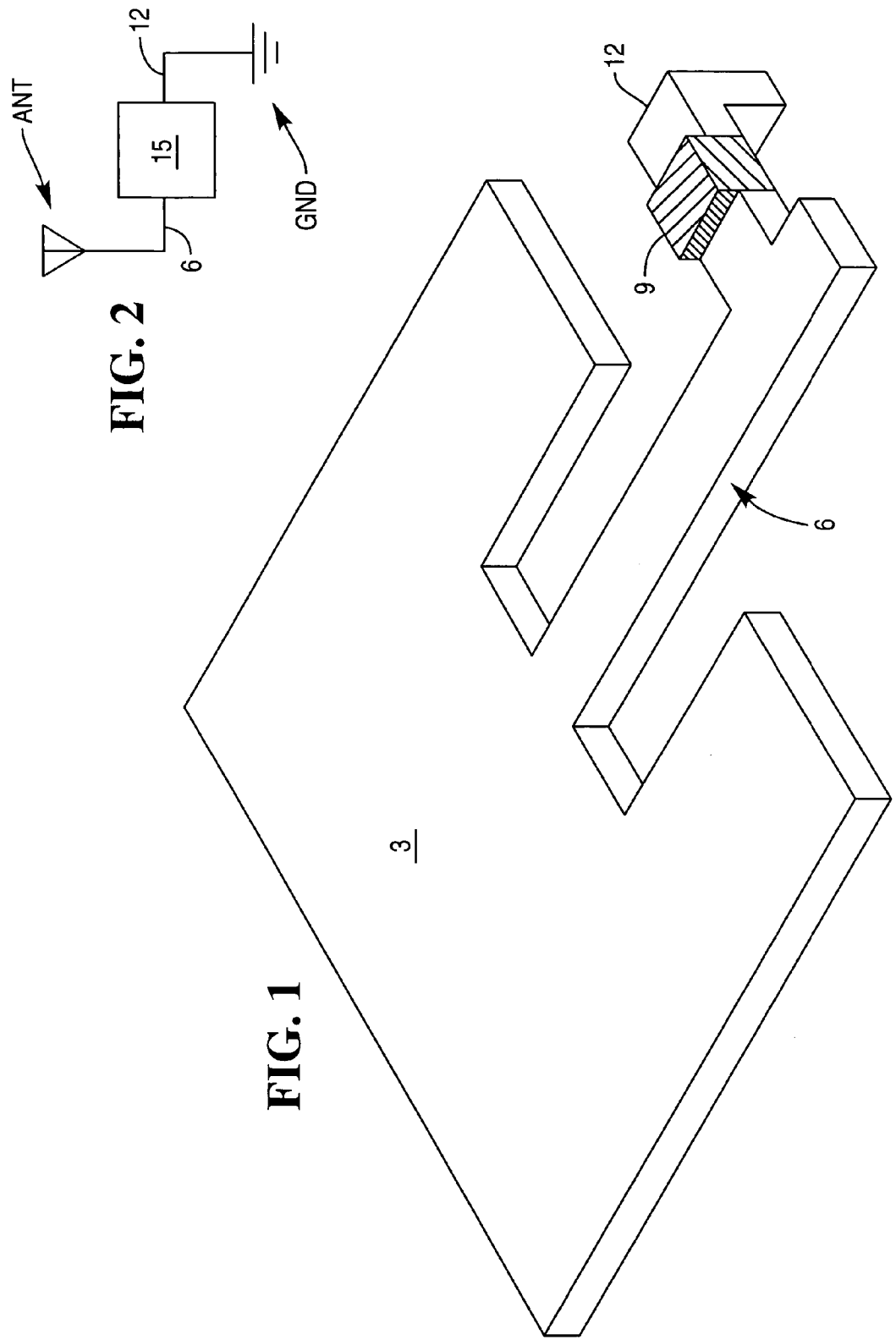

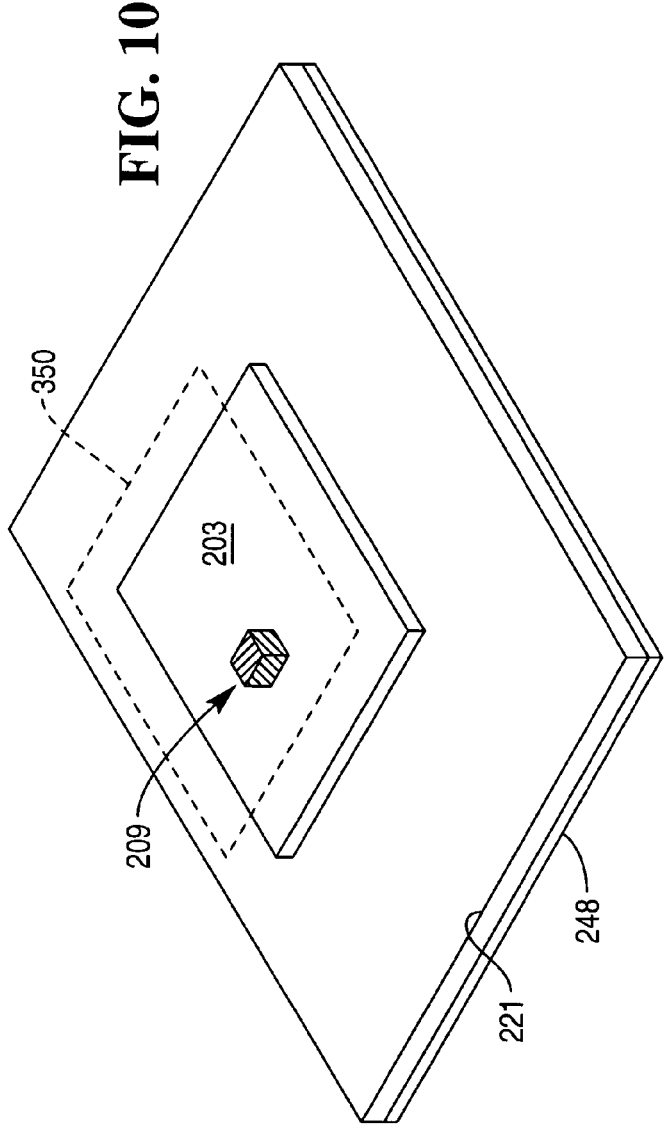
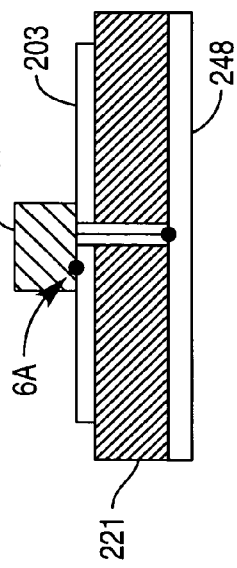
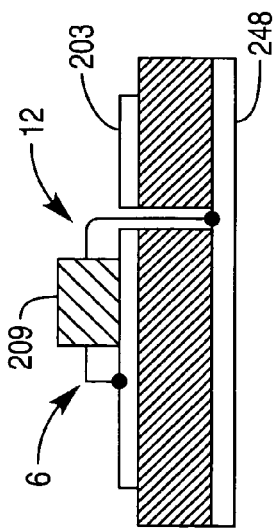

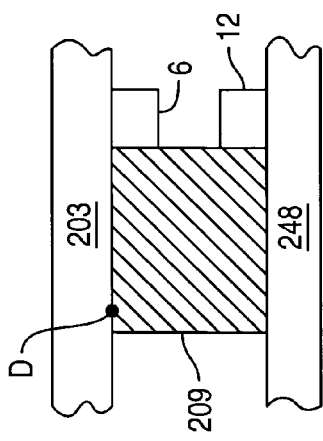
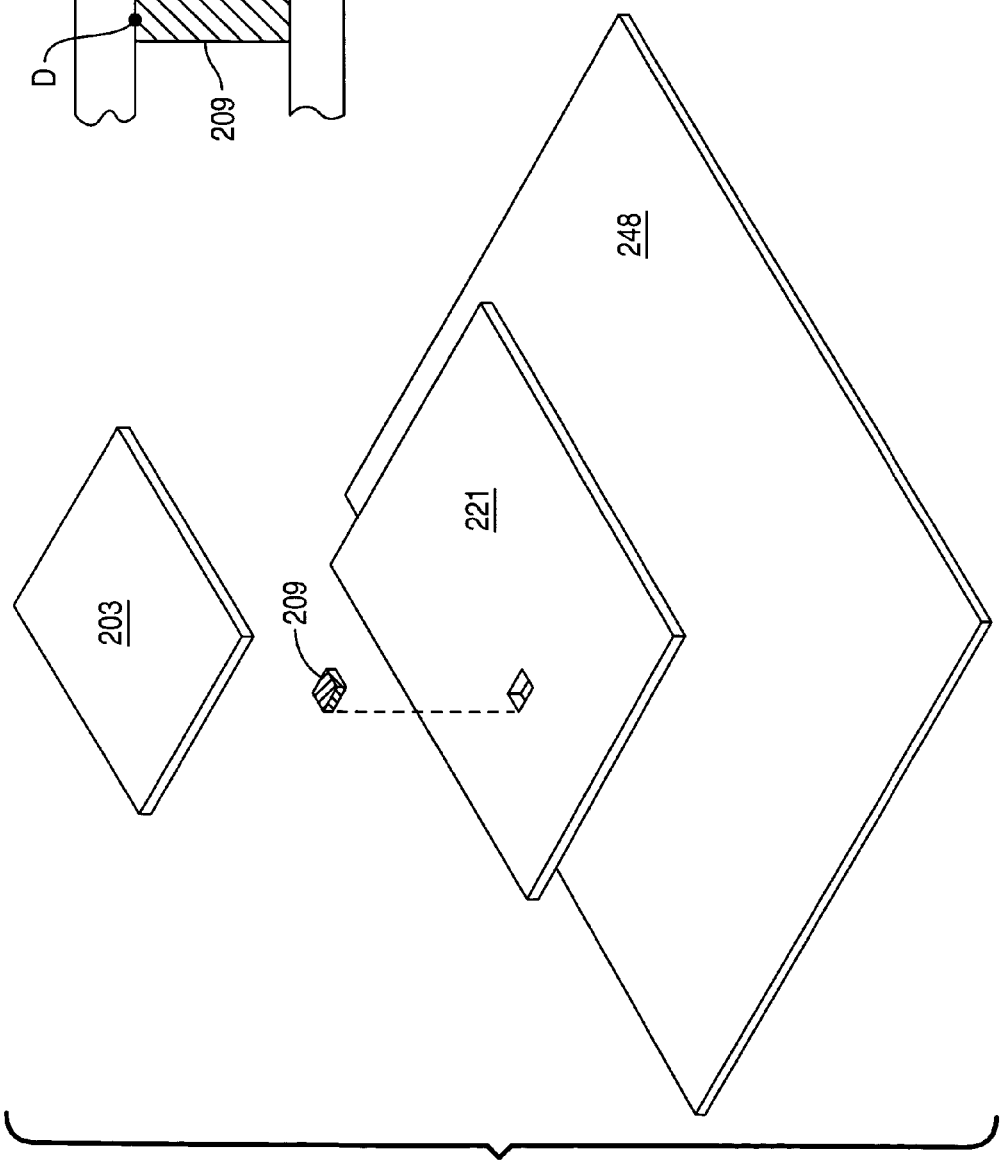

PATCH ANTENNA FOR RFID TAG

The invention concerns a patch antenna, sometimes called a microstrip or stripline antenna, used in connection with an RFID, Radio Frequency IDentification, tag.

BACKGROUND OF THE INVENTION

Numerous types of RFID tag are commercially available. A common type of RFID tag stores a small amount of data, such as an identifying number, and transmits the data to a nearby interrogating device, when the latter issues an interrogation signal.

In general, RFID tags can be viewed as containing four primary components. Three of the components are commonly fabricated in a single integrated circuit, IC, and they are: (1) a receiver, (2) a transmitter, both of which are sometimes termed a transceiver, and (3) memory to store data, such as the ID number stated above. The fourth component is an antenna, used to communicate with the interrogator.

In some designs, the antenna can be included in the IC, or fabricated on the same silicon wafer as the IC. The antenna can also be external to the IC.

In addition, other components can be present, to perform tasks such as (1) detecting an incoming interrogation signal, and in response launching a dormant tag into operation, (2) absorbing operating power from incoming rf radiation, (3) reading data in the memory and transmitting the data to the interrogator, and (4) discriminating an address in an incoming polling signal, to discern whether the interrogation signal is addressed to the RFID tag associated with the components, or to another RFID tag.

Some RFID tags are passive. They contain no power supply, and obtain operating power from rf energy delivered by the interrogator. Other RFID tags do contain power supplies, such as batteries of the size used in hearing aids. These latter RFID tags can not only transmit stored data, but they can also receive data from the interrogator, and can write the data received to memory in the RFID tag.

In general, passive devices do not receive and store incoming data but, of course, exceptions are possible.

The frequency of rf radiation used depends on the particular application of the RFID tags. For example, some tags use low-frequency radiation, in the AM or FM radio bands, which span roughly from 0.5 MHz to 150 MHz. Such radiation can pass through buildings and other structures. Using such radiation, one can read an RFID tag through a wall or building.

At higher frequencies, such as 1,000 MHz, the radiation begins to acquire the properties of visible light. Visible light will not penetrate walls and buildings. Using such high frequencies, one can only communicate with RFID tags which are within one's line-of-sight, with no intervening obstructions.

Further, at high frequencies, the presence of nearby conductive objects can interfere with operation of the RFID tags. While the detailed mechanism of the interference is complex, one can view the conductive objects as creating "echoes" of the rf signals. The echoes can jam communication. For example, the echoes can destructively add together, forming nulls where the net signal is zero. If the RFID tag or the interrogator is located at a null, no signal will be detected.

Therefore, when RFID tags using high-frequency radiation are used in the proximity of conductive objects, such as sea water or bodies of metal, problems can arise. As a specific example, problems are found when high-frequency RFID tags are used on steel shipping containers, particularly when multiple such containers are present.

OBJECTS OF THE INVENTION

An object of the invention is to provide an improved RFID tag, which can utilize high-frequency carrier frequencies, and operate in the presence of large conductive objects.

A further object of the invention is to use a patch antenna, also called a stripline antenna, in connection with an RFID tag.

A further object of the invention is to use a patch antenna in connection with an RFID tag, to allow the RFID tag to be attached to a steel shipping container.

SUMMARY OF THE INVENTION

A patch antenna is used in connection with an RFID tag, to accept incoming information, such as interrogation signals, and also to transmit data from the tag.

BREIF DESCRIPTION OF THE DRAWINGS

FIG. 1 illustrates a patch 3 which is used in one form of the invention.

FIG. 2 is a schematic, emphasizing the point that lines 6 and 12 in FIG. 1 are not connected together electrically.

Figure 3:
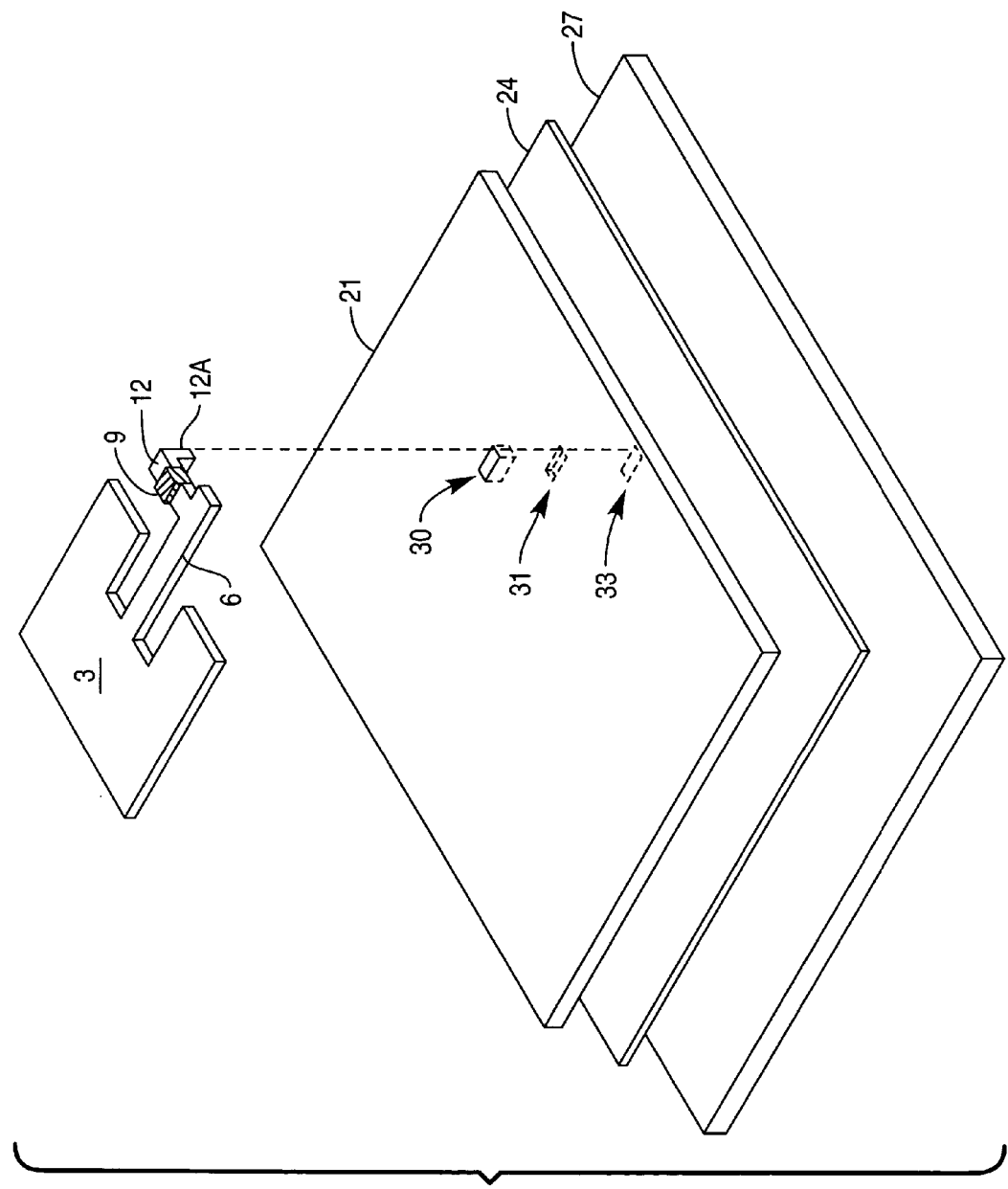
FIG. 3 illustrates one form of the invention in exploded form.
Figure 4:
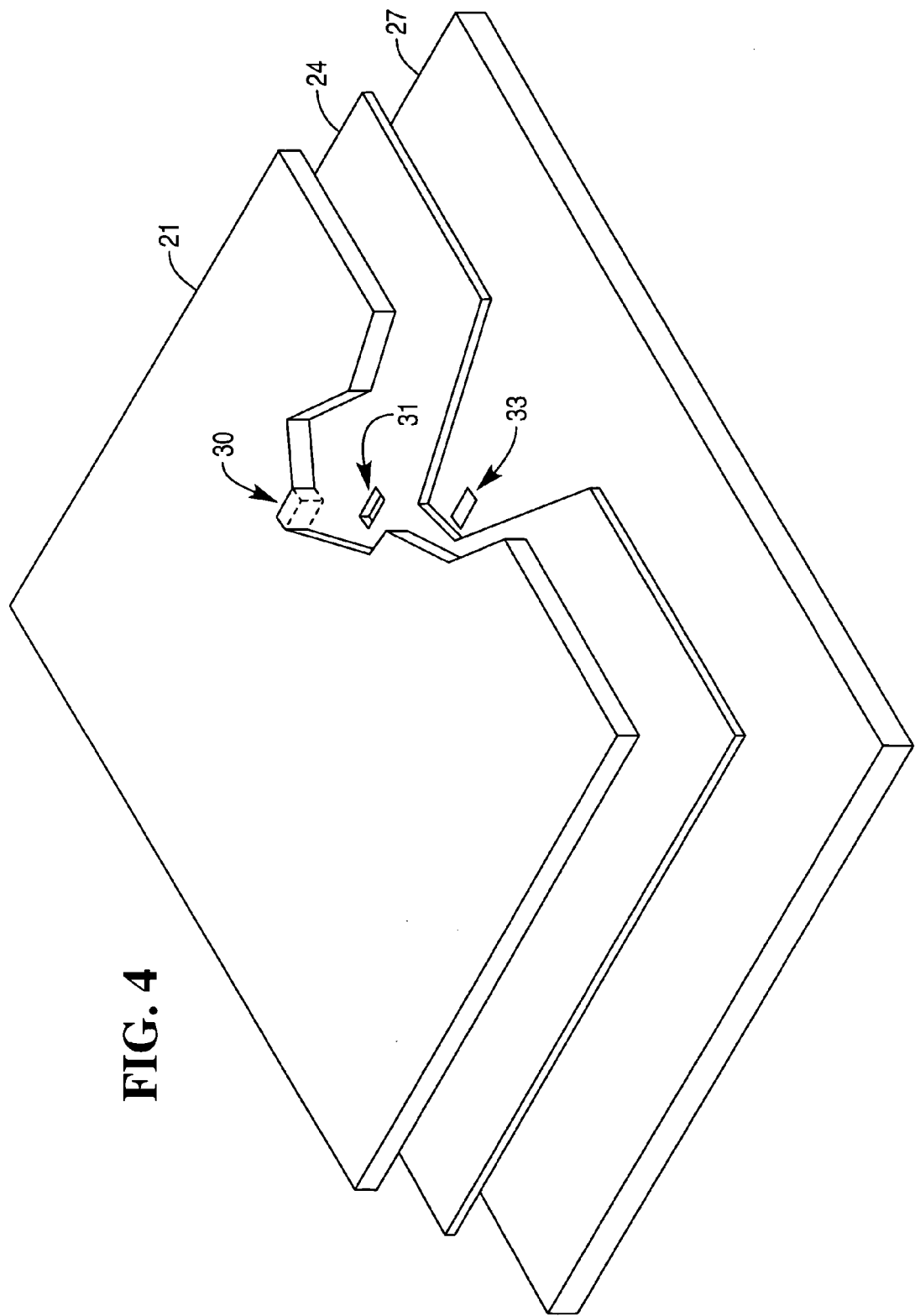

FIG. 4 illustrates part of FIG. 3, in cut-away view, to show windows 30 and 31, through which a conductor (not shown) passes, en route to contact region 33.

Figure 5:
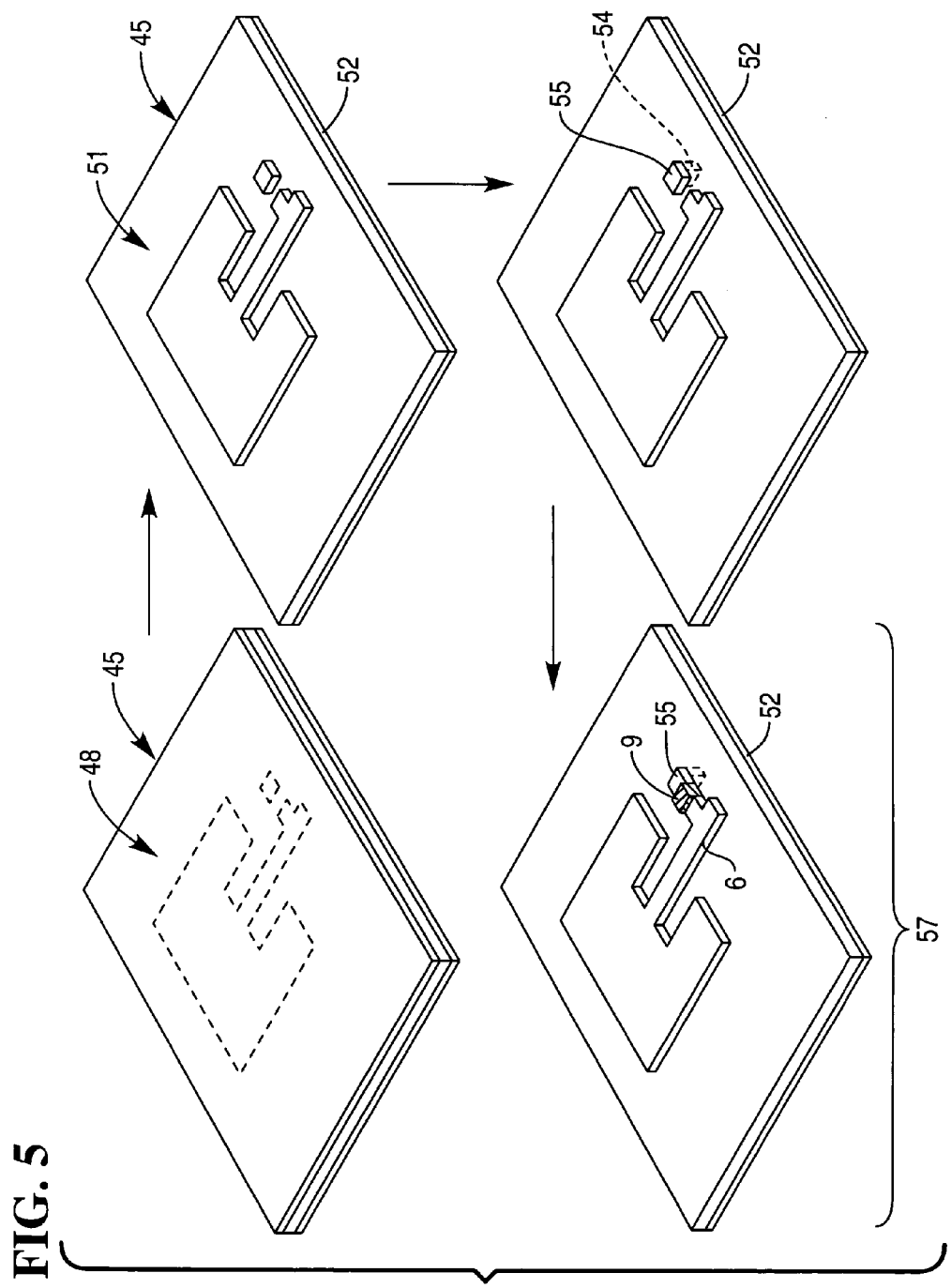

FIG. 5 illustrates a sequence of processing steps used in fabrication of one form of the invention.

Figure 6:
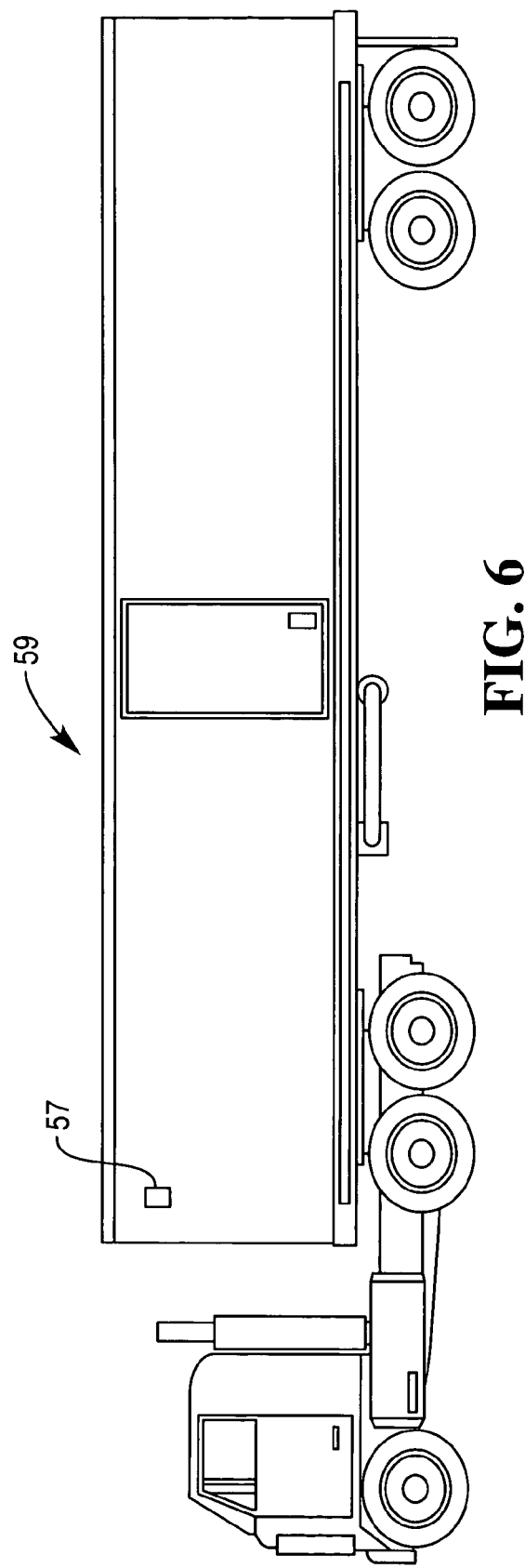

FIG. 6 illustrates one form of the invention 57, attached to a shipping container 59.

Figure 7:
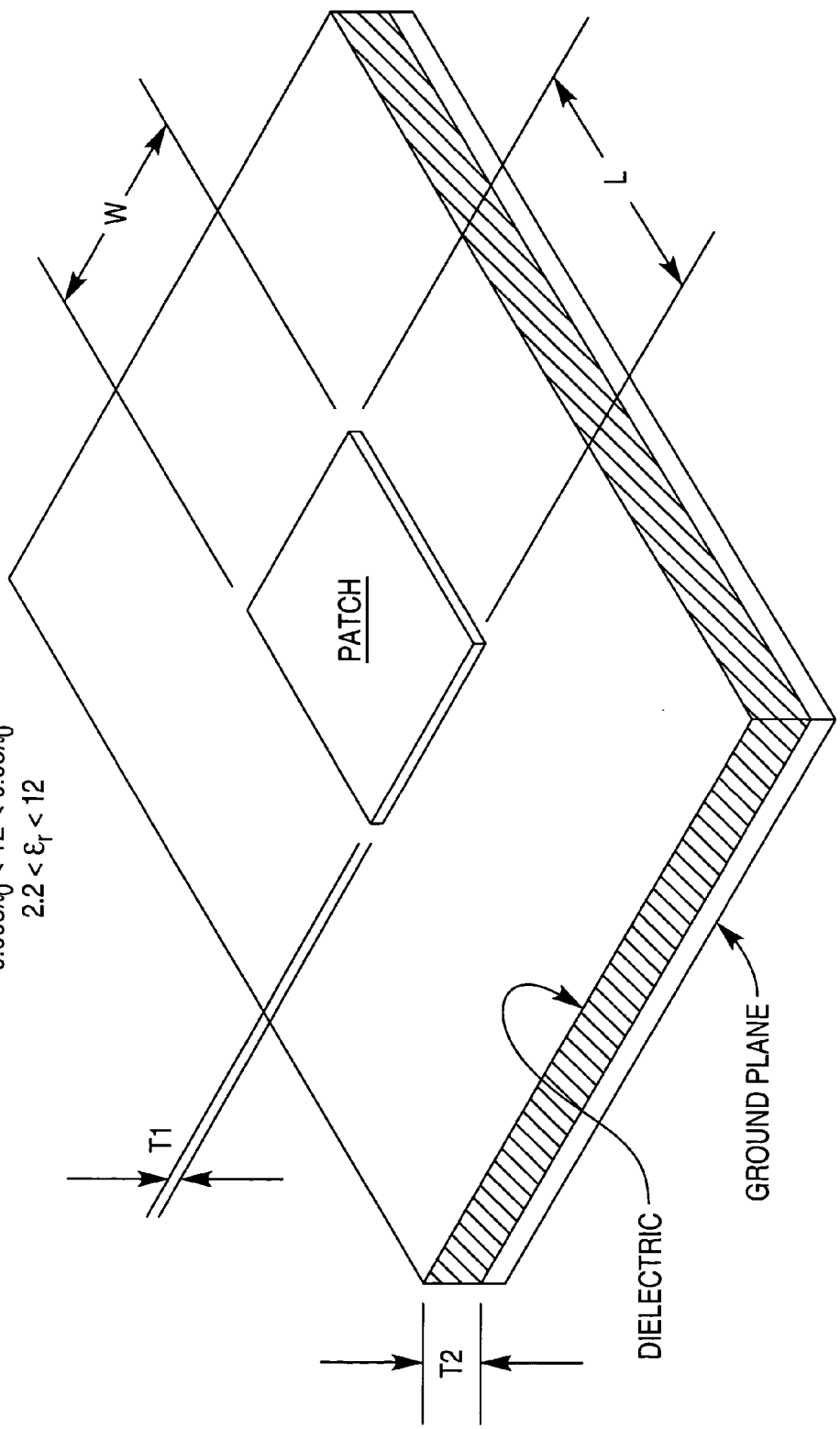

FIG. 7 illustrates one set of parameters used in the prior art to design a patch antenna.

Figure 8:
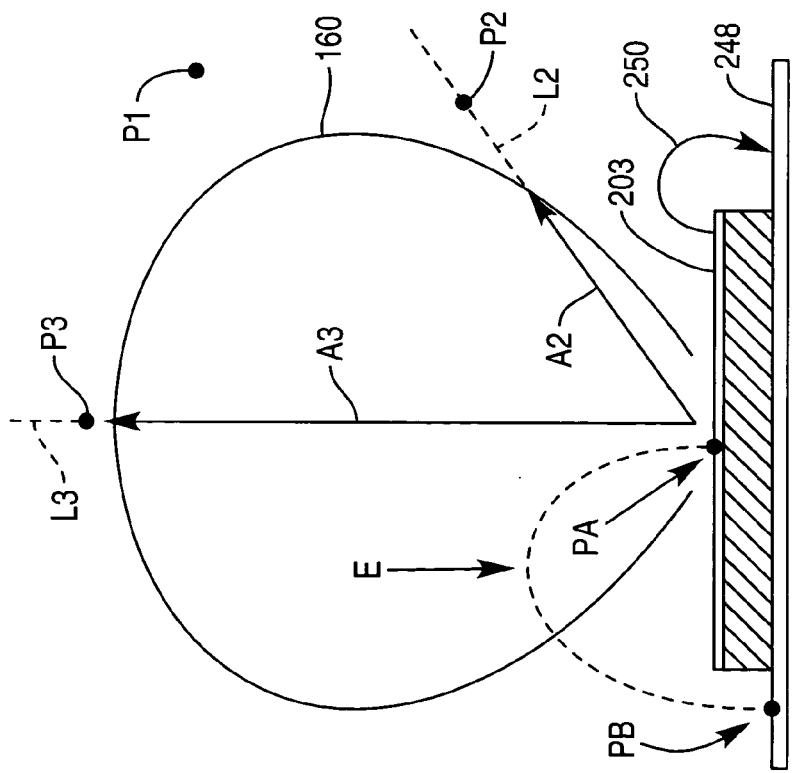

FIG. 8 illustrates a generalized radiation pattern of a patch antenna, together with the Inventor's illustration of a very weak electric field R.

Figure 9:
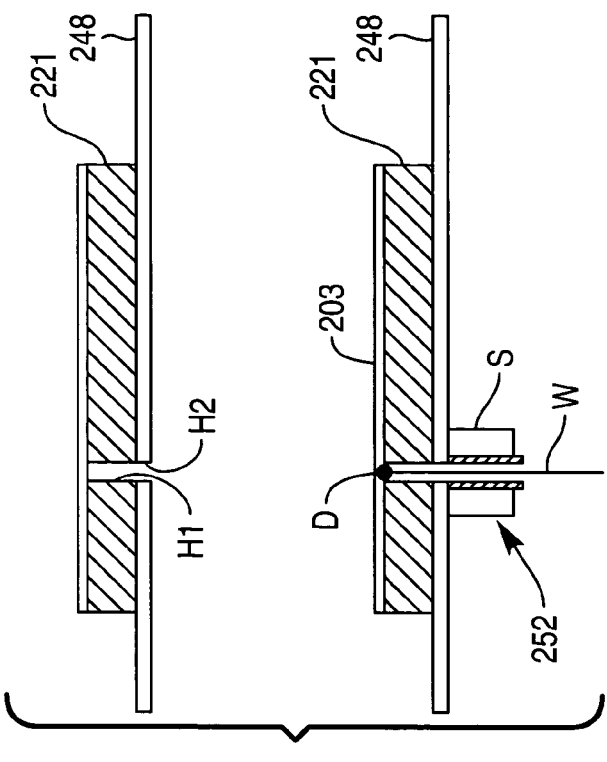

FIG. 9 illustrates one approach in the prior art for feeding a signal to a patch antenna.

FIGS. 10, 11, 12, 13, 14, 15, and 16 illustrate several embodiments of the invention.

Figure 18:
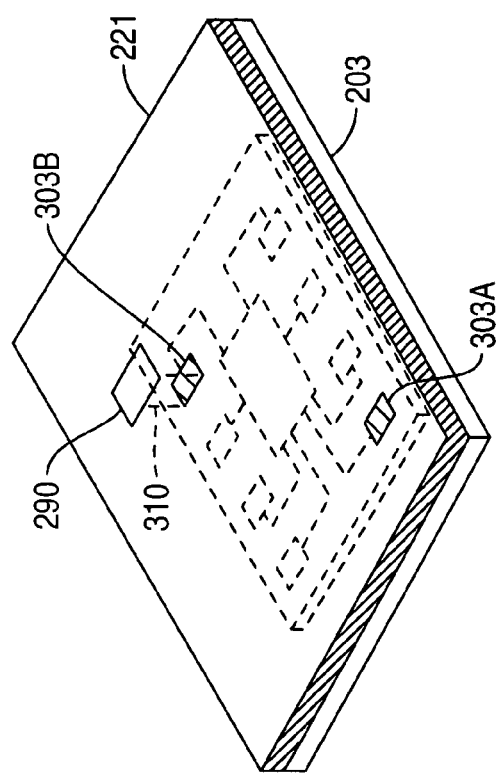
Figure 19:
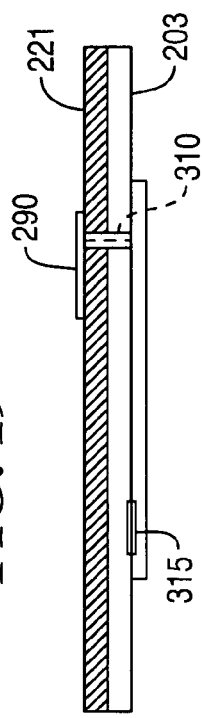
Figure 17:
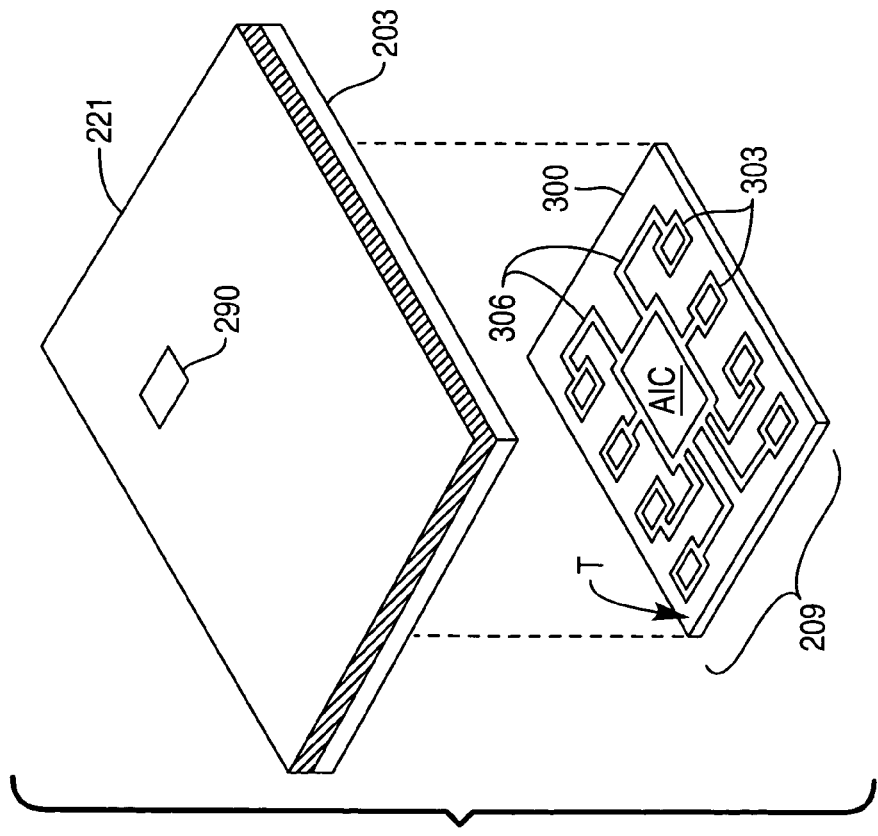

FIGS. 17, 18, and 19 illustrate another form of the invention, in different views.

DETAILED DESCRIPTION OF THE INVENTION

FIG. 1 illustrates a patch 3, constructed of a conductive sheet, or film, such as aluminum. The patch need not be the shape shown, and patches are used which are square, rectangular, circular, triangular, linear (that is, a long thin rectangle), and hollow, such as a flat doughtnut shape.

A feed line 6 is connected to the patch 3. Block 9 represents an RFID circuit, which contains the elements described in the Background of the Invention. Line 12 represents a ground line, which will be used to connect to a ground plane, later described.

Lines 6 and 12 are not connected together electrically, as shown by the schematic of FIG. 2. Line 12 is connected to ground, GND, in the form of a ground plane, later described. A signal generator 15, which corresponds to block 9 in FIG. 1, generates a signal, which is fed to an antenna ANT, through line 6.

FIG. 3 illustrates structures to which the apparatus of FIG. 1 is attached. The patch 3 is placed adjacent a sheet 21 of dielectric material, and is bonded to the sheet 21 in a known manner.

A film 24 of adhesive is placed adjacent the bottom side of the dielectric sheet 21. This adhesive is used to attach the dielectric sheet 21 to a metallic ground plane 27.

Ground plane 27 can take the form of a metallic sheet, or film, in which case FIG. 3 illustrates one embodiment of the invention, in exploded form. In another embodiment, ground plane 27 is provided by a metallic structure to which adhesive film 24 is attached. In this case, FIG. 3 illustrates the invention in actual use. However, in this case, the part of the invention which is made or sold would not, in general, include the ground plane 27.

Leg 12A of line 12 forms a via, or layer-to-layer connection, between the RFID circuit 9 and the ground plane 27. Window 30, in sheet 21, and window 31, in layer 24, allow the leg 12A to pass through the respective layers, en route to the ground plane 27. FIG. 4 shows the windows in cut-away view. Block 33 in FIGS. 3 and 4 indicates the attachment point of line 12 with the ground plane 27.

FIG. 5 illustrates a sequence of processing steps in one approach to fabricating the apparatus just described. The processing begins with what is conceptually a double-sided printed circuit board 45, shown at the upper left part of the Figure. As discussed later in connection with FIG. 7, the dimensions required of the actual patch antenna may require (1) a different thickness of copper than is obtained with ordinary printed circuit boards, (2) a different thickness of dielectric substrate, and (3) a different dielectric material. If so, it is known in the art how to fabricate board 45 in FIG. 5 conforming to those requirements.

The pattern, indicated by dashed lines 48 on board 45, is etched in the copper on the upper side of the board 45, producing the structure 51, shown at the upper right part of the Figure. The ground plane 52 on the lower side of the board 45 is not etched.

A via 54 is formed, as indicated at the lower right of the Figure, which connects pad 55 to the ground plane 52. The via 54 can be formed by drilling from the bottom of the board to the pad 55, and filling the drilled hole with solder. The entire assembly can then be nickel-plated, to reduce corrosion, and to facilitate later soldering.

The RFID circuit 9, at the lower left of the Figure, which can take the form of a surface-mount integrated circuit, is connected to the line 6 and pad 55, as by soldering. Pad 55 corresponds to line 12 in FIG. 1.

The entire assembly 57 of FIG. 5 can be attached to a common steel shipping container 59, as indicated in FIG. 6.

It may be desirable to make electrical contact between the ground plane 52 and the container 59. This can be accomplished by, for example, abrading a spot (not shown) on the container 59, to remove paint, corrosion, and other unwanted materials. Then the assembly 57 is attached to the container 59, using a conductive adhesive, such as an epoxy containing a powdered metal, such as silver powder.

FIG. 7 illustrates some generally accepted parameters used in the design of patch antennas, and various forms of the invention can be designed using some, or all, of those parameters. The symbol, $_r$, that is epsilon-sub-r, refers to the relative dielectric constant of the DIELECTRIC in FIG. 7.

FIG. 8 illustrates roughly the radiation pattern of a generic patch antenna. The Figure is a polar plot of electric field strength. It is emphasized that line 160 does not represent a boundary. That is, line 160 does not indicate that the electric field E is zero at point P1, outside the line 160.

Rather, line 160 indicates the relative electric field strength E, at different angles. For example, the relative electric field strength at any point P2 on line L2 is represented by the length of arrow A2. The relative electric field strength at any point P3 on line L3, a similar distance from the antenna as point P2, is represented by the length of arrow A3. The relative strengths of the two electric fields is represented by the relative sizes of the two arrows.

It is commonly accepted that the agency in a generic patch antenna which causes radiation is the fringing electric field between the patch 203 and the ground plane 248. Line 250 represents the fringing field.

Consistent with this, one standard mode of feeding a signal to a patch antenna is shown in FIG. 9. Holes H1 and H2, shown in the upper part of the Figure, are cut into the ground plane 248 and the dielectric 221. A coaxial cable 252, shown in the lower part of the Figure, is connected as indicated. The shell or sheath S is connected to the ground plane 248. The signal wire W is connected to the patch 203, as indicated by dot D.

The coaxial cable 250 is located at a position which is removed from the fringing field 250 of FIG. 8, and does not interfere with the fringing field 250.

In one form of the invention, the RFID circuit 209 occupies the position indicated in FIG. 10, on the patch 203. That is, the RFID circuit 209 is located on the top of the patch 203, and the dielectric 221 is located on the bottom of the patch 203.

This positioning is justified by the argument just given with regard to the coaxial cable 252 in FIG. 9. Just as the coaxial cable 252 does not interfere with the fringing field 250 in FIG. 8, so will the RFID circuit 209 in FIG. 10 refrain from interfering with the fringing field 250 in FIG. 8.

The RFID circuit 209 can be connected to the patch 203 and the ground plane 248 as indicated in FIGS. 11 and 12. In FIG. 12, it is pointed out that the line 6 of FIGS. 11 and 1 may largely be eliminated. Dot 6A in FIG. 12 represents the signal connection to the patch 203, and can take the form of a direct connection between a pad (not shown) on the IC within RFID circuit 209 and the patch 203. This type of direct connection is discussed again later.

Under this arrangement, the RFID circuit 209 in FIG. 10 is located entirely within a boundary 350 defined by the periphery of the patch 303. That is, if the dielectric 221 is made the same size as the patch 203, then the entire apparatus is contained within the perimeter 350, which bounds the patch 203 and dielectric 221.

Figure 15:
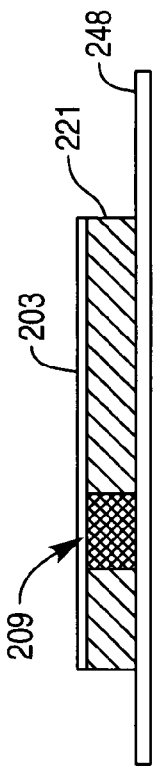

In another embodiment, the RFID circuit 209 can be embedded within the dielectric 221, as shown in FIG. 13. Line 6 and line 12 are shown in FIG. 14. FIG. 15 shows a cross-sectional view.

It is noted that RFID circuit 209 may take the form of a die cut from a silicon wafer. The RFID circuit is fabricated on that die. In general, the RFID circuit will be fabricated on the surface of the die. That is, the transistors, resistors, traces, and so on only penetrate one, or a few, microns into the die. Thus, a pad may be fabricated on the die, represented by dot D in FIG. 14, which can make direct contact with the patch 203. Then line 6 would not be needed, but line 12 would be present, and would connect to the top of the die, where the integrated circuit has been fabricated. Conversely, the dot D could contact the ground plane 248, in which case line 12 would not be needed, but line 6 would be present, running from the surface on the die where the integrated circuit is formed to the patch 203.

Figure 16:
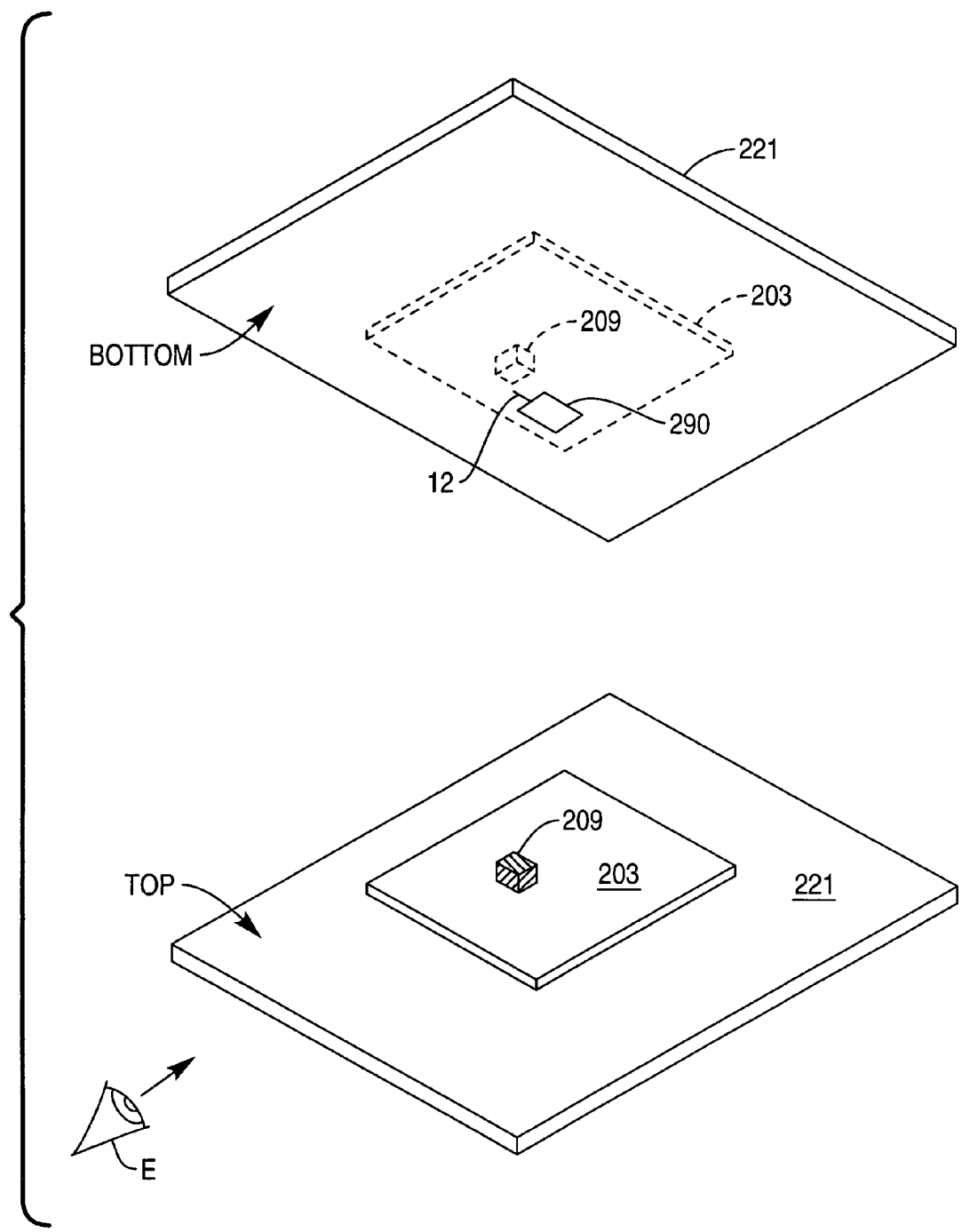

In some situations, as explained above, the ground plane 248 in FIG. 13 may not be associated with the RFID circuit as manufactured, but may be later provided by a metallic surface onto which the RFID circuit is affixed. For such a situation, the lower part of FIG. 16 shows a top view of RFID circuit 209 applied to patch 203, which is affixed to dielectric 221. Dielectric 221 may be manufactured the same size as patch 203.

The upper part of the Figure shows a view of the bottom of the dielectric 221, as seen by eye E. Patch 203 and RFID circuit 209 are drawn in phantom at the top, because the dielectric 221 blocks their view.

Affixed to the bottom surface of the dielectric 221 is a conductive pad 290, which is connected to the RFID circuit 209, by line 12, which extends through the dielectric 221. The overall assembly of FIG. 16 is attached to a metallic container, such as 59 shown in FIG. 6. The pad 290 of FIG. 16 makes contact with the wall of the container. The wall then acts as a ground plane.

That is, when the assembly is attached to the metallic container, the conductive wall of the container provides the function of the ground plane 27 in FIG. 3.

FIG. 17 illustrates another embodiment. The RFID circuit 209 is fabricated onto a silicon substrate 300 (or other substrate if silicon technology is not used), which substrate 300 is a die cut from a larger silicon wafer. The Inventor points out that the RFID circuit 209 occupies the top surface T of the substrate 300. Pads 303 connect with the active part of the IC, AIC, through traces 306. The RFID circuit 209 is attached to the patch 203, which is here shown below the dielectric 221.

Several pads 303 are shown. Many of these can be used for testing purposes, during manufacture of the RFID circuit 209. However, after manufacture, in one form of the invention, only two pads are used in the operative invention, namely, (1) a pad connecting to the signal lead, such as lead 6 in FIG. 1, and (2) a pad connecting either to the ground plane 27 in FIG. 3, or to pad 290 in FIG. 17 which, in turn, will later connect to a ground plane, such as the wall of a shipping container. The other pads are insulated from the patch 203.

The two pads which are used are labeled 303A and 303B in FIG. 18. Pad 303B connects to pad 290 through via 310. FIG. 19 is a cross-sectional view. The connection between pad 303A in FIG. 18 and the patch 203 is indicated by rectangle 315 in FIG. 19.

One mode of operation of the invention is here emphasized. As explained above, one type of RFID tag obtains its operating power from incoming rf radiation, which is received by the tag's antenna. In the situation of FIG. 8, that incoming radiation creates the fringing field 250, causing power to flow into the RFID circuit.

One explanation for this power flow is the reciprocity theorem of antenna theory. That theorem states, in simple terms, that an antenna which radiates an electric field represented by arrow A2, is also a good absorber of a similar incoming electric field A2. That is, an antenna which generates a field when energized, also becomes energized when a similar field is generated by an external source.

The Inventor points out that, in the power-absorption mode, the RFID circuit can be electrically shielded by the patch 203 from the incoming radiation, yet can derive power from that radiation. For example, the RFID circuit 209 in FIG. 13 would be shielded from incoming radiation entering from above, by patch 203. Nevertheless, the RFID circuit 209 can absorb energy from the patch antenna.

Similarly, while RFID circuit 209 in FIG. 10 may appear to be exposed to incoming radiation, it is submitted that such is not actually the case. The incoming electric field vector can be broken into two components, one parallel with the patch 203, and one perpendicular to the patch 203.

Since the patch 203 is conductive, the net field parallel to its surface, at the surface, must be zero. This is a standard boundary condition in electromagnetic theory. Thus, the RFID circuit 209, in being adjacent to the patch 203, sees a zero field component parallel with the patch 203, at the surface of the patch 203.

The component which is perpendicular to the patch 203 will be one of the fringing fields 250 in FIG. 8. It will extend from, for example, point PA to point PB, roughly indicated by dashed line E. However, the field strength will be equal to (1) the voltage difference between the patch 203 and the ground plane 248, (2) divided by the length of dashed line E. That field strength will be less than that of fringing field 250.

Further, this calculation of field strength presumed that the charge density across the patch 203 is uniform, or that charge is present at point PA. That is not necessarily so.

One model for the patch antenna states that the charge density is concentrated at the edges of the patch, and is zero, or nearly so, in the central region of the patch. Thus, under this model, the electric field along path E in FIG. 8 will be substantially zero.

Therefore, it can be said that, while the RFID circuit does not directly receive incoming radiation, it nevertheless can derive power from the antenna immersed in the radiation.

Definitional matters. A distinction is drawn between an "RFID tag," and an "RFID circuit." The former is operative to receive and transmit rf signals, and includes an antenna. The latter, the "RFID circuit," contains an electrical circuit, probably an integrated circuit, but lacks an antenna.

Of course, "antenna" is used in a practical sense. If an RFID circuit, lacking an antenna, is sufficiently close to a device transmitting data at the frequency for which the RFID circuit is designed, the RFID circuit will pick up that data, using its internal wiring as antenna. Nevertheless, the separate antenna used in normal operation is absent.

The RFID circuit stores data, and acts as a radio transceiver, which transmits the data. It may perform other functions. It may continually transmit the data, or may do so only when prompted by a polling signal.

One definition of "RFID tag" is the combination of (1) an RFID circuit with (2) an antenna. That is, the RFID circuit is largely inoperative, without the antenna. (Again, as stated above, the internal conductive traces on the RFID circuit can broadcast RF signals, which can be picked up at short range, without an antenna. However, in ordinary usage, an added antenna is used.)

Another definition of "RFID tag" is a small device, which is ordinarily portable until attached to an object, and which stores a code or number, and transmits that code/number. It may transmit the code/number periodically, or may do so only when prompted by an interrogation signal. It may perform other functions.

"Small" means (1) at least smaller than a brief case measuring 20×18×2 inches. "Small" can further mean smaller than 3×4×0.5 inches. "Small" can further mean smaller than 1×1×0.2 inches.

One specific type of RFID tag is the passive type, which derives operating power from incoming radiation, and which is not self-powered.

A specific type of passive RFID tag is the type which performs a single function, namely, transmitting a number stored within it when prompted to do so by an interrogation signal.

The term "patch antenna" is a term-of-art. One definition is a section of a strip line, wherein one conductor of the strip line forms a ground plane, and the other conductor, smaller in area than the ground plane, acts as an antenna.

It is known that patch antennas need not be flat.

A specific form of the invention utilizes a patch antenna in connection with a non-self-powered, passive, RFID circuit, operating at frequencies above 900 MHz. As explained above, the ground plane of the patch may take the form of the conductive wall of a shipping container. In such a case, it is expected that the problem of signal nulls discussed above, and other problems caused by nearby conductive objects, will be reduced.

A type of trade-off is seen here. Patch antennas, in general, are characterized by narrow bandwidth, low efficiency, and low gain, compared with antennas commonly used with RFID tags, such as dipole antennas. However, these disadvantages can be offset by the elimination of the problems otherwise caused by the metallic shipping container to which the RFID is attached.

From another point of view, a self-powered RFID circuit can transmit a stronger signal than a passive RFID circuit, which would imply a higher signal-to-noise ratio, which would imply less significant interference from nearby reflective objects, compared with a passive device. Under this reasoning, the passive RFID circuit would benefit from the patch antenna more than would a self-powered RFID circuit, because the passive RFID is more subject to noise problems.

RFID tags sometimes contain printed labels. Such a label can overlay part, or all, of the dielectric sheet 21 in FIG. 3. The label can be printed on the dielectric sheet 21, or can be printed on a separate sheet which is attached to the dielectric sheet 21.

Numerous substitutions and modifications can be undertaken without departing from the true spirit and scope of the invention. What is desired to be secured by Letters Patent is the invention as defined in the following claims.

The invention claimed is:

1. An apparatus comprising:
    a) a dielectric sheet having a top surface and a bottom surface;
    b) a conductive sheet adjacent to the top surface;
    c) a conductive pad adjacent to the bottom surface;
    d) a passive RFID circuit comprising:
        i) a signal lead connected to the conductive sheet; and
        ii) a ground lead connected to the conductive pad;
    wherein the conductive pad by itself is not effective to act as a ground plane in a patch antenna connected with the passive RFID circuit, although the conductive pad is configured for selective placement adjacent to a metallic surface of a shipping container that is effective to act as a ground plane in a patch antenna connected with the passive RFID circuit.

2. The apparatus according to claim 1, wherein the ground lead and the conductive pad facilitate connection of the passive RFID circuit to a metallic surface of a shipping container.

3. The apparatus according to claim 1, further comprising an adhesive sheet adjacent to the bottom surface of the dielectric sheet and configured to facilitate selective securement of the dielectric sheet to a metallic surface of a shipping container.

4. The apparatus according to claim 1, wherein the passive RFID circuit is embedded within the dielectric sheet.

5. The apparatus according to claim 1, further comprising a label positioned to be visible when the dielectric sheet is secured to a metallic surface of a shipping container.

6. The apparatus according to claim 1, wherein the ground lead extends through the dielectric sheet in connecting the passive RFID circuit and the conductive pad.

* * * * *